May 2, 1961 J. E. WHITE 2,982,942
DIRECTIONAL SOUND DETECTION
Filed Jan. 7, 1953 3 Sheets-Sheet 3

JAMES E. WHITE
INVENTOR.

BY D. Carl Richards
ATTORNEY

United States Patent Office 2,982,942
Patented May 2, 1961

2,982,942

DIRECTIONAL SOUND DETECTION

James E. White, Dallas, Tex., assignor, by mesne assignments, to Socony Mobil Oil Company, Inc., a corporation of New York Filed Jan. 7, 1953, Ser. No. 329,990

14 Claims. (Cl. 340—16)

This invention relates to sound propagation studies and more particularly to single point observation of selected variables for the determination of the direction and magnitude of flow of sound energy. More specifically the invention relates to low frequency sound detection.

The direction of a sound path in a given medium and the magnitude of the sound energy are important factors in a number of fields. Sound studies have been adopted on a wide scale in seismic exploration for underground structures indicative of possible petroleum accumulations. Sound detection in connection with navigation and associated marine problems also is widely utilized. In general such prior art systems utilize the slight difference in the time of arrival at spaced detecting points and the relative orientation of such points for sensing the direction of sound travel.

In accordance with the present invention, observations of selected properties of the sound field are taken at a single point in a given medium and are combined to indicate the sound intensity. Sound intensity is defined as the time rate of transmission of energy per unit area. It is a vector and therefore has both magnitude and direction. If the sound field under observation is due to a single sound source in an extended medium, then the intensity is a vector which points toward the source of sound. The amplitude of the vector and its direction completely describe the sound field. The sound intensity is the product of sound pressure and particle velocity. The sound intensity may vary rapidly with time, but if the average rate of flow of energy across an incremental area is desired, the product may be average in accordance with the expression $$\text{Average intensity} = \frac{1}{T}\int_0^T pv_a dt$$

where p is the pressure in a given point; and $v_a$ is the component of particle velocity normal to the incremental area at the point of observation.

In accordance with the present invention, the sound in a given medium is measured by detecting variations in pressure at a selected point in the medium to produce a first signal, detecting orthogonally directed components of the particle velocity of the medium at the selected point to produce signals proportional respectively to the components of particle velocity and then registering a characteristic of the vector sum of the products of the pressure signal and each of the particle velocity signals whereby the vector sum of the products is equal in amplitude to the magnitude of the sound intensity and is vectorially directed toward the source of sound. Further, in order to measure with suitable clarity the direction of sound, the time integrals of the above products are registered to overcome the effects of random energy components of a complex sound field.

For a further understanding of the invention, reference may now be had to the following description taken in conjunction with the accompanying drawings in which:

Fig. 1 diagrammatically illustrates the direction sensing system of the present invention;

Figure 1:
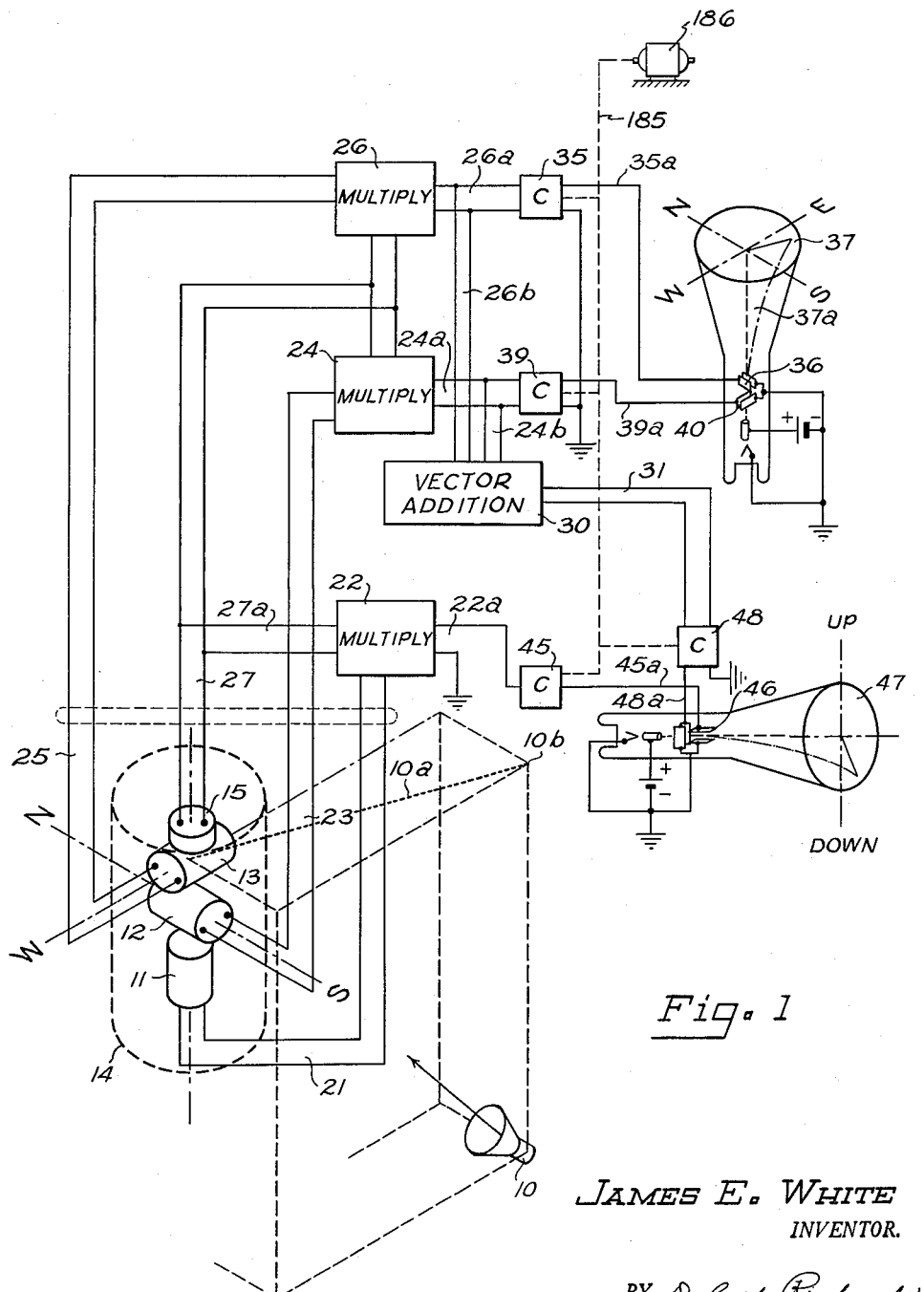

Referring now to Fig. 1, a system for detecting the direction and magnitude of sound energy flow from a source 10 is illustrated as including three velocity sensitive detectors 11, 12 and 13 mounted at a listening station in a suitable supporting structure generically represented by the dotted outline 14. The first detector 11 is positioned with its axis vertical as to be sensitive to the vertically directed component of particle velocity at the listening station. The second detector 12 is oriented with its axis horizontally directed along a north-south line. The third detector 13 is oriented with its axis horizontally directed along an east-west line. A source of sound in the form of a loud-speaker has been shown generically to represent any source positioned in the medium common to the detectors.

A fourth detector, a pressure sensitive device 15, is positioned at the same location as the velocity sensitive detectors 11–13. The first detector 11 is connected by way of a pair of conductors 21 to a first multiplier 22. The second detector 12 is connected by way of a circuit 23 to a second multiplier 24. The third detector is connected by way of a circuit 25 to a third multiplier 26. The pressure sensitive detector 15 is connected by way of a circuit 27 to each of the three multipliers 22, 24 and 26. The multipliers 22, 24 and 26, shown in Fig. 1 in block form, are shown in detail in Fig. 2 and will later be described.

In the multiplier 26 the pressure generated signal and the east-west velocity component signal are multiplied and averaged to produce a physical condition appearing as a unidirectional product voltage in the output circuit 26a. This voltage is applied to a chopper 35 whose output is then applied by way of conductor 35a to an east-west sensing means in a suitably oriented display device such as the deflecting plate 36 in cathode ray oscilloscope 37.

Similarly, the north-south velocity-dependent voltage and the pressure-dependent voltage are applied to multiplier 24. The averaged output of multiplier 24 appearing on channel 24a is a unidirectional voltage which is applied to the second chopper 39 driven in synchronism with the first chopper 35. The output of chopper 39 is applied by way of conductor 39a to the north-south deflecting plate 40 of the oscilloscope 37. The voltages on plates 36 and 40 produce deflections of the cathode beam 37a and cause a radial line to appear on the face of the oscilloscope 37. The radial line lies in the same azimuth with respect to the directional axes on its face as does line 10a connecting the listening location of the geophones 12 and 13 and the projection of the location of loud-speaker 10 to point 10b in the horizontal plane passing through the listening location.

By combining the pressure sensitive signal and the orthogonally directed particle velocity signals to produce the product voltages, the direction of the path of sound is clearly indicated on the oscilloscope 37. Utilization of the pressure sensitive signal and the horizontally directed particle velocity signals from detectors 12 and 13 for the production of a direction indication on the oscilloscope 37 is but one of the results of applicants' procedure. The intensity of the horizontal component of the sound intensity is proportional to the length of the ray or line on the face of the oscilloscope 37 so that upon suitable calibration of the associated electronic devices the intensity may be quantitatively measured. Further, the particle velocity-dependent signal from the vertical detector 11 and the pressure-sensitive signal from the pressure-sensitive detector 15 are combined to produce another product voltage. This product voltage is combined with a unidirectional voltage proportional to the vector sum of the velocity-dependent signals from detectors 12 and 13, to obtain the remaining information needed to locate the sound source in space. Thus the direction and magnitude of sound intensity in a vertical plane passing through the axis of the vertically oriented detector 11 is portrayed.

More particularly, the pressure-dependent signal on channel 27 is applied to the multiplier 22 by way of channel 27a. The signal dependent upon the vertically directed component of particle velocity on channel 21 is then multiplied with the pressure-dependent signal and averaged to produce a unidirectional voltage in circuit 22a which is applied to a third chopper 45. Chopper 45 is driven in synchronism with choppers 35 and 39. The output voltage from chopper 45 is then applied by way of conductor 45a to the vertical deflecting plate 46 in a second suitably oriented cathode ray oscilloscope 47. The presence of the latter voltage alone will produce a radially directed ray confined to a vertical line whose magnitude is proportional to the vertical component of the sound intensity at the listening station.

In order to portray the elevation component of the direction of sound on the same basis as the azimuth presentation on device 37, signals from the multipliers 24 and 26, respectively dependent upon horizontal particle velocity components, are applied by way of channels 24b and 26b to a vector addition sytem 30 which produces in response to such signals a unidirectional voltage in its output channel 31 proportional to the vector sum of the horizontally directed particle velocities. The system 30, shown in block form, is illustrated in detail in Fig. 3 and will later be described. The voltage in channel 31 is applied to a fourth chopper 48. Its output is applied by way of conductor 48a to the horizontal deflecting plate of the cathode ray oscilloscope 47.

It will be appreciated that sound intensity has two characteristic features, magnitude and direction. In the system of Fig. 1, having presented both the azimuth and elevation components of the second characteristic of sound intensity, i.e. direction, on the devices 37 and 47, respectively, the true location of a source of sound in a given medium may readily be determined. The magnitude of the deflection of the cathode ray beam is a direct measure of the second characteristic of sound intensity, i.e. its magnitude. Thus on devices 37 and 47 the two components of both the magnitude and the direction of sound intensity are presented completely to describe the sound field.

Random noise appearing at the listening station which might render a presentation unintelligible may be readily eliminated by integrating the outputs of the multipliers 22, 24 and 26. For measurements in a noise free field, integration may be dispensed with but it has been found preferable to provide integration means in all practical cases. In a system having an integration means truly random noise will not materially affect the data presentation on the oscilloscopes 37 and 47. A constant and continued indication of the direction of sound at a given point will be obtained if the sound is of a continuous nature. For example, the path of a surface vessel may be readily followed using only a two component system. Submerged crafts likewise will be followed by use of the three component system in connection with two registering systems 37 and 47. Further, sources producing pulses separated by substantial intervals may also be sensed with this system so long as the signal persists over the major portion of any given integration interval. It has been found that sound pulses produced at widely spaced intervals, such as the clanking of the moorings on buoys or the like, register a direction indication with considerable accuracy.

The foregoing indicates some of the fields of application of the system. Now there will be considered the more specific features of the multipliers 22, 24 and 26 and the features of the vector addition circuit 30.

Figure 2:
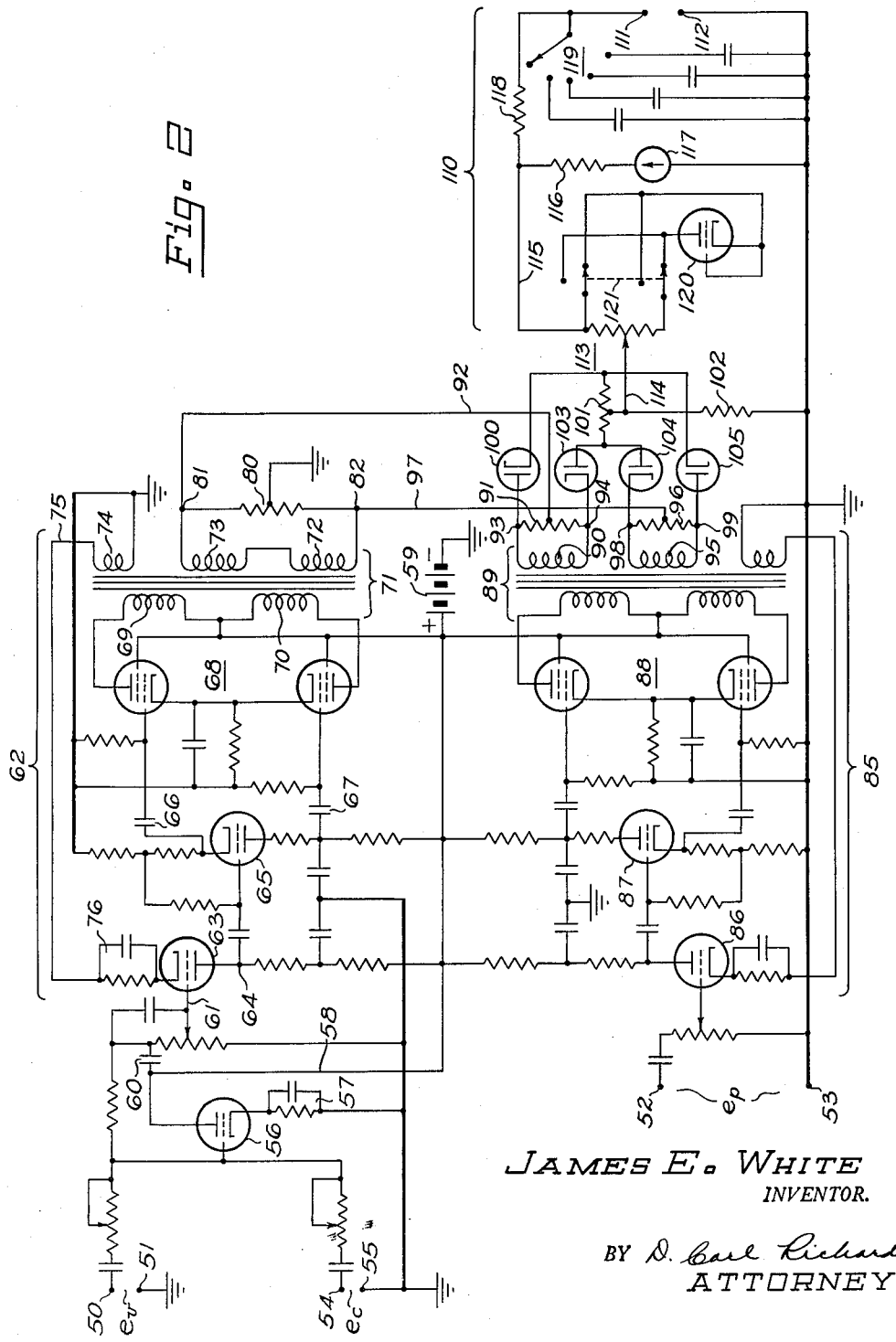
Fig. 2 is a circuit diagram of a preferred form of multiplier.

A suitable multiplier is illustrated in Fig. 2, and while the multiplier is described in detail and claimed in copending application Serial No. 330,122, filed January 7, 1953, for Robert L. Mills and Joseph Zemanek, Jr., coworkers of applicant, its construction and operation will briefly be described here.

For the purpose of the present description, it will be assumed that a velocity signal ($e_v$) is applied to the first pair of input terminals 50 and 51. The pressure sensitive signal ($e_p$) will be applied to the second pair of input terminals 52 and 53. A carrier function ($e_c$) is then applied to the third pair of input terminals 54 and 55. The velocity signal ($e_v$) and the carrier signal ($e_c$) are mixed in the grid of a mixing tube 56. The mixing tube is provided with a cathode biasing circuit 57 and is connected by way of conductor 58 at its anode to a suitable source of B-supply, such as battery 59. Its output is coupled through condensers 60 to the input grid 61 of a first feed-back amplifier 62. For convenience, the signal appearing at the anode of the first amplifier tube 63, namely at point 64, will now be referred to as $S_1$ and it should be remembered in the following description that $S_1$ is merely the sum of the velocity-dependent voltage and a carrier voltage. The carrier is preferably high in frequency compared to the sound signals to be measured and has an amplitude preferably higher than the sum of the amplitudes of the velocity and pressure signals.

The signal $S_1$ at point 64 is applied to the grid of a phase inverter stage including tube 65. The output voltages from the inverter tube 65 are coupled by way of condensers 66 and 67 to the input grids of a push-pull power amplifier stage 68. The signal output of stage 68 is impressed upon the primary windings 69 and 70 of an output transformer 71. Transformer 71 is provided with a pair of secondary windings 72 and 73 and a tertiary winding 74. One terminal of the tertiary winding 74 is connected to ground and the second terminal is connected by way of conductor 75 back to the cathode biasing network 76 of the input tube 63 and thus forms a portion of a feed-back loop for stabilizing the amplifier 62.

The secondary windings 72 and 73 are connected in series and are shunted by a center tapped impedance 80. The center tap is connected to ground so that at the upper terminal 81 there appears a voltage $+S_1$. At the lower terminal 82 the voltage with respect to ground is $-S_1$.

Consider now amplifier 85 for the pressure-dependent signal, having as its input the terminals 52 and 53. Amplifier 85 is identical in all respects with amplifier 62, having an input tube 86, a phase inverter stage including tube 87 and a push-pull power amplifier stage 88 whose output circuit includes a second transformer 89. For convenience in nomenclature, the signal ($e_p$), the pressure-dependent signal passing through amplifier 85, will now be referred to as a second signal $S_2$. The transformer 89 has a first secondary winding 90 which is shunted by a center tapped impedance 91. The central tap is connected by way of conductor 92 to the upper terminal 81 of winding 73. Therefore, between ground and the upper terminal 93 of secondary 90 the voltage is $(S_1+S_2)$. Similarly between the lower terminal 94 of secondary 90 and ground the voltage is $(S_1-S_2)$.

The second secondary winding 95 of transformer 89 is shunted by a center tapped impedance 96. The central tap on the impedance 96 is connected by way of conductor 97 to the lower terminal 82 of secondary winding 72. Therefore, at the upper terminal 98 of secondary 95 and ground the voltage is $-(S_1+S_2)$, and between the lower terminal 99 of secondary 95 and ground is $-(S_1-S_2)$.

It will thus be seen at points 93, 94, 98 and 99 there are four voltages which effectively are all of the possible polarity variable permutations of the signals $S_1$ and $S_2$. The four signals are then applied to unidirectionally conductive circuits having a common output impedance across which there is developed a voltage which is proportional to the product of $S_1$ and $S_2$. More particularly, a first diode 100 is connected at its anode to point 93 and at its cathode to one terminal of a balancing impedance 101. A load impedance 102 is connected between ground and the center point on the balancing resistor 101.

A second diode 103 is connected at its cathode to point 94 and at its anode to the second terminal of balancing impedance 101. A third diode 104 is connected at its cathode to the point 98 and at its anode to the second terminal of the balancing impedance 101. The fourth diode 105 is connected at its anode to point 99 and at its cathode to the first terminal of the balancing impedance 101.

With the foregoing circuit arrangement where the signal $S_1$ is comprised of one of two functions to be multiplied and a high frequency high amplitude carrier and the second signal $S_2$ is the second of two signals to be multiplied, currents will flow downward through impedance 102, when $S_1$ and $S_2$ are of the same polarity and will flow upwards during the intervals when $S_1$ and $S_2$ are dissimilar in polarity. The magnitude of current flow at any instant is controlled by the smaller of the two signals $S_1$ or $S_2$ so that the voltage appearing across impedance 102 due to such current flow in a series of positive and negative pulses of frequency the same as the carrier. By eliminating the carrier frequency components, the residual voltage is the true product of the two functions, in this case the velocity-dependent function $(e_v)$ and the pressure-dependent function $(e_p)$.

The voltage across output impedance 102 is applied to an output circuit 110 for transmission to terminals 111 and 112 of a unidirectional voltage proportional to the product of the two input functions and dependent in sign upon the phase relations between the two input functions. The output circuit includes a potentiometer 113 connected at its tap 114 to the upper terminal of impedance 102 and by way of conductor 115 to a metering circuit including impedance 116 and meter 117. A smoothing or filtering network is also provided and includes series resistor 118 and selectively variable capacitance means connected to the terminals of a multi-point selector switch 119. Resistor 118 and condensers connected to switch 119 serve to filter to selected degrees the output voltage to present a unidirectional voltage at output terminals 111 and 112.

After careful adjustment of the connections on resistors 80, 91 and 96, a residual unbalance across resistor 102 has been found to persist even though $(e_p)$ and $(e_v)$ are both zero. This unbalance is believed due to thermal effects in diodes 100, 103, 104 and 105. This unbalance is compensated by the circuit of tube 120. Tube 120 is a triode having its grid connected to cathode and to two terminals of a reversing switch 121. The anode of tube 120 is similarly connected to two remaining terminals of switch 121 so that there is produced across the potentiometer 113 a voltage produced by the thermal effects due to heating the cathode of tube 120. Switch 121 provides a means for selecting a polarity of this compensating voltage and the variable tap 114 for selecting its amplitude.

The system shown in Fig. 2 may be provided for each of the multipliers 22, 24 and 26.

Figure 3:
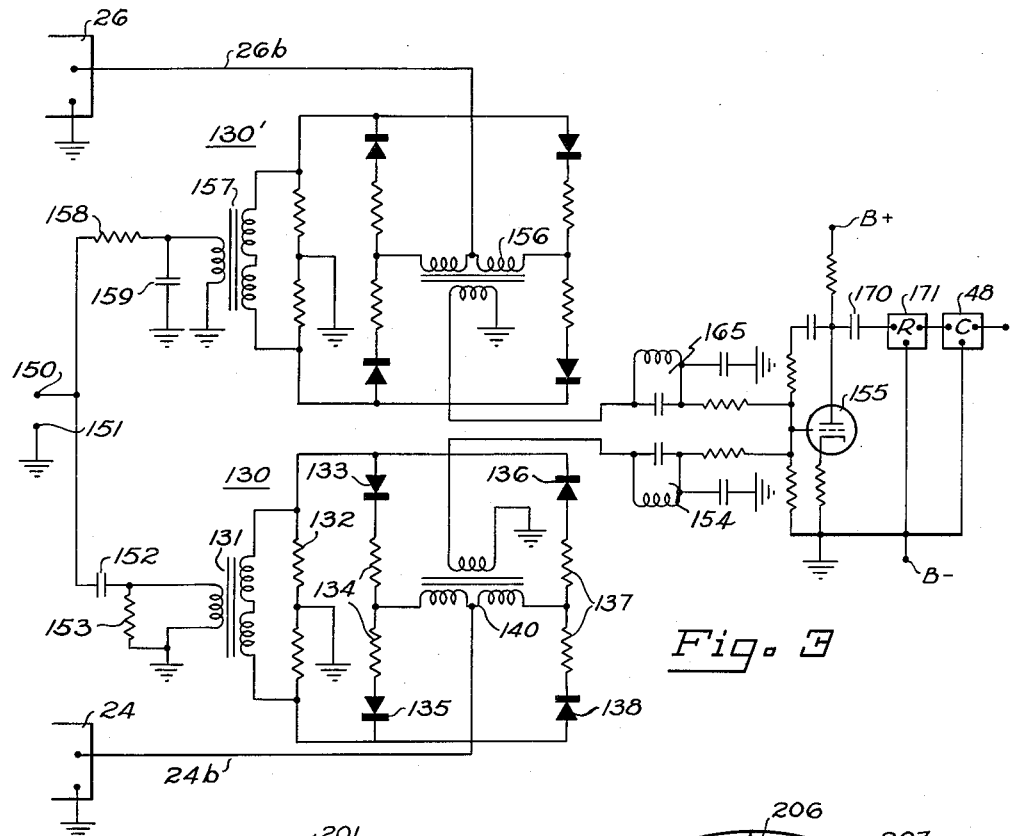
Fig. 3 is a circuit diagram of a suitable system for vector addition.

Referring now to Fig. 3, a system is illustrated for providing vector addition of the outputs of multipliers 24 and 26 and thus suitable for producing a horizontal deflecting voltage for the elevation displaying oscilloscope 47.

The signals from multipliers 24 and 26, unidirectional voltages, are applied by way of conductors 24b and 26b to modulators 130 and 130', respectively. Modulator 130 comprises an input transformer 131 having a secondary winding shunted by a center tapped impedance 132. The central point on impedance 132 is connected to ground. The secondary winding also is shunted by two series circuits, the first of which comprises a rectifier 133, a center tapped impedance 134 and a second rectifier 135. Rectifiers 133 and 135 are connected with like polarities. The second series circuit includes a rectifier 136, a second center tapped impedance 137 and a second rectifier 138. Rectifiers 136 and 138 are connected with like polarities but opposite the polarities of rectifiers 133 and 135. A transformer 140 is connected with its two primary windings in series between the center points of the impedances 134 and 137. The conductor 24b from multiplier 24 is connected to the center point of the series connected primary windings of transformer 140, and a current is thus caused to flow through the primary windings and through the rectifiers and the impedance 132 to the central ground connection on impedance 132. A sine wave voltage is applied between the input terminal 150 and ground terminal 151 and in turn is transmitted to the primary winding of transformer 131 through a phase shifting network which includes condenser 152 and resistor 153. The signal across the primary of transformer 131 is thus shifted 45° from the voltage applied to terminals 150, 151. This signal then appears in the secondary winding of transformer 140. It is clipped at a level depending upon the magnitude of the D.C. output of multiplier 24 as applied to the primary winding of transformer 140. This clipped output voltage is then filtered in the circuit 154 and the resulting sine wave is applied to the grid of a mixing tube 155.

The second modulator 130' is identical in construction and operation with modulator 130 except that the clipping in transformer 156 is controlled by the voltage output of multiplier 26, the second horizontal component. The sine wave voltage applied to terminals 150, 151 is impressed upon the input transformer 157 of modulator 131, but it bears a phase relation of 90° with respect to the signal across input transformer 131. This is accomplished by passing the signal through a second phase shift network comprised of resistor 158 and condenser 159 which shifts the signal 45° from the input signal and in sense opposite the shift produced by elements 152 and 153. Thus there is induced in the secondary winding of transformer 156 a clipped sine wave voltage, the clipping level being controlled by the output of multiplier 26. The phase relation is 90° from the output of modulator 130.

The clipped voltage is filtered by network 165 and the resulting sine wave is applied to the grid of the mixing tube 155. The two voltages on the grid of tube 155 are merely added in a true vectorial relationship so that the output of tube 155 is proportional to the vector sum of the particle velocity signals from the horizontally directed detectors 12 and 13 of Fig. 1. The output is coupled by way of condenser 170 to a rectifier 171 to produce a unidirectional voltage which is then applied to the fourth chopper 43. Referring now to Fig. 1, the output chopper 43 is applied to the horizontal deflecting plates of the oscilloscope 47 so that the direction and the length of the ray on the face of the oscilloscope 47 indicates the direction in a vertical plane of the sound source 10 and the intensity of sound from that source at the listening station.

The voltages applied to the oscilloscope 37 by way of conductors 35a and 39a are square wave pulses having magnitudes proportional to the product of the horizontal velocity components and the pressure component. The pulses have signs dependent upon the phase relations between the pressure signal and the velocity signals. The two voltages are applied in a 90° space relationship as determined by the relative orientation of the deflecting plates 36 and 40 so that the deflection of beam 37a represents the vector sum of the signals on conductors 35a and 39a. The ray appearing on the face of oscilloscope 37 may lie in any of the four quadrants depending upon the relative signs and amplitudes of the two voltages. The same is true of the display on the device 47. The choppers 35, 39, 45 and 48 have been illustrated merely by blocks and may be mechanically driven switches all controlled by a common mechanical coupling such as indicated by the dotted line 185 leading to the shaft of a motor 186. The choppers might also be matched vibrators driven from a common alternating current source to apply deflecting pulses to the cathode ray deflecting device simultaneously.

Figure 4:
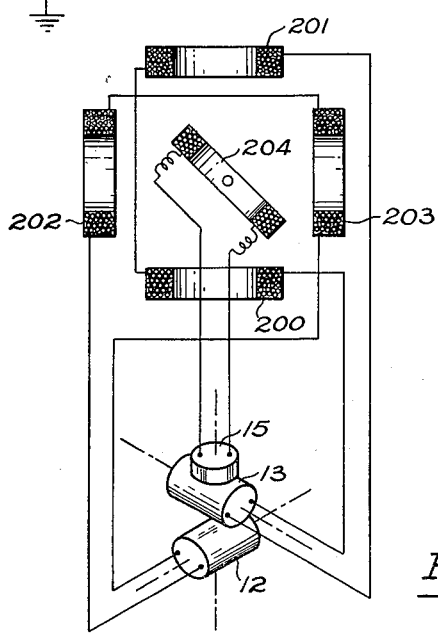
Figs. 4 and 5 illustrate a dynamometer system for registering the product of two observed parameters for indicating direction.
Figure 5:
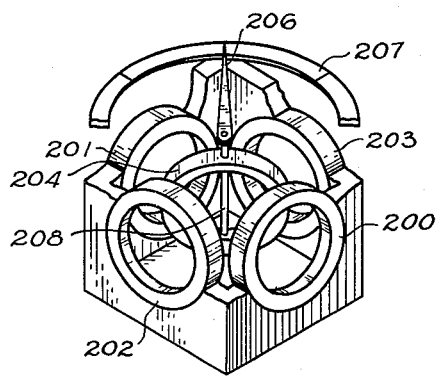

The foregoing description relates to an electronic system for producing a sensible indication of sound intensity in a given medium. In contrast, Figs. 4 and 5 illustrate an electromechanical system which may be utilized to sense a characteristic feature of sound intensity. In general, sound intensity has two characteristic features, magnitude and direction. The system of Figs. 1–3 may be utilized to measure either or both of the characteristics whereas the electromechanical system of Figs. 4 and 5 may be utilized to measure one of the characteristics, namely the direction of sound intensity.

In Figs. 4 and 5 horizontally directed detectors 12 and 13 each generate a signal which is velocity dependent. The signals thus generated are applied to a pair of dynamometer coils. As illustrated, the detector 13 is connected to the series connected coils 200 and 201. The latter coils are spaced apart with their axes lying on a common line. Current from detector 13 flowing through the coils produces a substantially uniform magnetic field in the space between the coils. Similarly, the output of detector 12 is applied to the series connected coils 202 and 203. Coils 202 and 203 are spaced apart with their axes lying on a line which is perpendicular to the axes of coils 200 and 201. Current flow through coils 202 and 203 produces a second magnetic field at right angles to the first field and substantially uniform in the space between the coils.

A fifth coil 204 is pivoted for unrestrained rotational movement with respect to an axis which is perpendicular to the axes of the coils 200 and 201 and coils 202 and 203. The pressure detector 15 is connected to the fifth coil 204. When current flows through coil 204, a torque is exerted upon it which is proportional to the product of the pressure-dependent current in coil 204 and the velocity-dependent current from detector 13 in coils 200 and 201. The magnitude of this torque, in addition to being dependent upon the magnitudes of the two currents, is also dependent upon the relative angular position of coil 204 relative to coils 200 and 201. Similarly, a second torque is exerted upon the coil 204 which is proportional to the product of the pressure-dependent current from detector 15 and the velocity-dependent current from detector 12. Here again this second torque is dependent upon the angular position of the coil 204 relative to coils 202 and 203.

It can be shown that the two torques thus developed will cause the coil 204 to rotate about its pivotal axis to a particular angular position at which the two torques are equal and opposite, and at this angular position it will remain at rest. It can further be shown that the equilibrium angular position has the same relationship to the axes of the pairs of coils 200—201 and 202—203 as the direction of the sound intensity vector has to the location of the detectors 12 and 13.

In Fig. 5 a pointer 206 has been illustrated as carried by the shaft supporting coil 204 and cooperating with a suitable scale or protractor device 207 whereby the direction of the sound intensity may be directly read from the protractor.

It will now be apparent that the system illustrated in Figs. 4 and 5 will be suitable for sensing direction from a listening station to the projection into the plane of the two particle velocity detectors of the location of the source of sound.

Velocity sensitive detectors such as the type ordinarily used in seismic exploration have been found to be suitable for detecting the three components of velocity. However, it will be appreciated that velocity-dependent signals may be produced by utilizing pressure detectors throughout the system. For example, the vertically oriented detector 11 of Fig. 1 may be replaced by a system capable of producing a signal representative of the vertical pressure gradient. The latter signal has the same characteristics as vertical particle acceleration so that by integrating the pressure produced signal there is produced a velocity signal. The detector 11 could be replaced by a pair of pressure sensitive detectors spaced vertically one from the other by distance short compared to the wave length of sound energy of interest. The pressure detectors are connected in opposition to produce a signal proportional to the difference between pressures at the location of the two detectors which is then integrated and the integrated output applied to multiplier 22. Identical systems horizontally oriented along the north-south and east-west axes would replace velocity detectors 12 and 13 to apply signals to multipliers 24 and 26, respectively.

Having explained the invention in detail in connection with the above description of certain modifications, it will now be apparent that other modifications may suggest themselves to those skilled in the art and it is intended to cover such modifications as fall within the scope of the appended claims.

What is claimed is:

1. The method of measuring sound in a given medium which comprises detecting variations in pressure at a receiving station in said medium to produce a first signal, detecting two orthogonally directed components of particle velocity at said receiving station to produce a pair of signals proportional respectively to said velocities, and registering a characteristic of the vector sum of the products of each of said pair of signals and said first signal.

2. The method of measuring sound in a given medium which comprises detecting variations in pressure at a receiving station in said medium to produce a first signal, detecting two orthogonally directed components of particle velocity at said receiving station to produce a pair of signals proportional respectively to said velocities, multiplying said first signal with both of said velocity-dependent signals to produce two physical conditions representative thereof, vectorially adding the physical conditions to produce a vector sum, and producing a sensible indication of said vector sum.

3. The method of measuring sound in a given medium which comprises detecting variations in pressure at a receiving station in said medium to produce a pressure-dependent signal, detecting two orthogonally directed components of particle velocity at said receiving station to produce a pair of signals proportional respectively to said particle velocities, producing a first force field proportional to the product of said pressure-dependent signal and one of said particle velocity signals, producing a second force field normal to said first force field proportional to the product of said pressure-dependent signal and the second of said velocity-dependent signals, and sensing a characteristic of the vector sum of said fields.

4. A system for sensing sound intensity in a given medium which comprises means at a receiving station in said medium for detecting variations in pressure to produce a first signal, means at said receiving station for detecting orthogonally directed components of particle velocity at said receiving station to produce velocity-dependent signals proportional respectively to said components of particle velocity, multiplying means for combining said first signal with said velocity-dependent signals, and means for registering a characteristic of the vector sum of the products of said first signal and said velocity-dependent signals.

5. A system for determining a characteristic of sound intensity from a source in a given medium which comprises means at a receiving station in said medium for detecting variations in pressure to produce a first signal, means at said receiving station for detecting two orthogonally directed components of particle velocity at said receiving station to produce velocity-dependent signals proportional respectively to said components of particle velocity, means for multiplying said first signal by each of said velocity-dependent signals to produce a pair of product signals, a movable force responsive sensing means at a registering station, and means at said registering station responsive to said product signals for producing a pair of orthogonally directed force fields to move said sensing means into a positional relationship with respect to said force fields the same as the projection of said source of sound into the plane of said orthogonally directed components bears with respect to said components.

6. A system for determining a characteristic of sound intensity from a source in a given medium which comprises means at a receiving station in said medium for detecting variations in pressure to produce a first signal, means at said receiving station for detecting two orthogonally directed components of particle velocity at said receiving station to produce velocity-dependent signals proportional respectively to said components of particle velocity, means for multiplying said first signal by said velocity-dependent signals to produce a pair of product signals, a movable electron beam and a beam target at a registering station, and means adjacent said beam responsive to said product signals for producing a pair of orthogonally directed force fields to deflect said beam to a position on said target that bears the same relationship with respect to said force fields as the projection of said source of sound into the plane of said orthogonally directed components bears with respect to said components.

7. A system for measuring sound intensity in a given medium which comprises means at a receiving station for detecting variations in pressure to produce a first signal, means for detecting orthogonally directed components of particle velocity at said receiving station to produce signals proportional to said components of particle velocities, means for producing a first moving force field proportional to the product of said first signal multiplied by one of said velocity-dependent signals, means for producing a second moving force field having a direction perpendicular to said first moving force field proportional to the product of said first signal multiplied by a second of said velocity-dependent signals, and registering means responsive to the vector sum of said moving force fields for registering a characteristic of the vector sum of the products of said first signal multiplied by said velocity-dependent signals.

8. A system for measuring sound intensity from a given source in a transmitting medium which comprises a pressure responsive detector positioned at a receiving station in said medium to produce a first signal, velocity sensitive means oriented with their axes mutually perpendicular for detecting orthogonally directed components of particle velocity at said receiving station to produce a pair of velocity-dependent signals, means for multiplying said first signal by one of said velocity-dependent signals to produce a first product voltage, means for multiplying said first signal by the second of said velocity-dependent signals to produce a second product voltage, a cathode ray oscilloscope having mutually perpendicular beam deflection means, and means for applying said first product voltage and said second product voltage respectively to said beam deflection means whereby said cathode ray bears the same positional relation with respect to said beam deflecting means as the projection of said source into the plane of the axes of said velocity sensitive means bears to said axes.

9. A system for measuring sound intensity from a given source in a transmitting medium which comprises a pressure detector positioned at a receiving station in said medium to produce a first signal, a pair of velocity sensitive detectors oriented with their axes mutually perpendicular for detecting orthogonally directed components of particle velocity at said receiving station and to produce a pair of velocity-dependent signals, a pair of spaced apart coils connected to one of said velocity sensitive detectors for producing a first magnetic field, a second pair of spaced apart coils having their axes perpendicular to the axes of said first pair of coils for producing a second magnetic field perpendicular to said first magnetic field, freely movable coil means in said magnetic fields, and means for connecting said pressure detector to said coil means for producing a pair of torques thereon upon flow of current from said pressure detector to move said coil means to the same positional relationship with respect to said magnetic fields as the projection of said source to the plane of the axes of said velocity sensitive detectors bears to said axes.

10. A system for sensing sound intensity from a source in a given medium which comprises a pressure sensitive detector for generating a first pressure signal, a pair of sound responsive devices oriented for maximum response to particle motion along paths at right angles to each other and positioned adjacent said pressure detector for producing two velocity signals proportional to the components of particle velocity along said paths, an indicating means movable about an axis, means for producing a moving force on said indicating means along one line passing through said axis proportional to the product of said pressure signal and one of said velocity signals, and means for producing a moving force on said indicating means along a line passing through said axis and perpendicular to said first line proportional to the product of said pressure signal and the second of said velocity signals whereby said indicating means will bear the same positional relationship with respect to said first and second lines as the source of sound bears with respect to said paths.

11. A sound intensity sensing system which comprises detecting means at a receiving station including a pressure responsive device for producing a pressure-dependent signal and a pair of detectors oriented along mutually perpendicular lines for producing signals proportional to particle velocities along said lines, two field producing means oriented at right angles to each other, a first circuit interconnecting a first of said two detectors and a first of said field producing means for producing an indication proportional to the product of said pressure-dependent signal and one of said particle velocity signals, a second circuit interconnecting the second of said two detectors and the second of said field producing means for producing an indication proportional to the product of said pressure-dependent signal and the second of said velocity signals, and common means for indicating a characteristic of the vector sum of said fields.

12. The method of determining sound intensity in a given medium which comprises detecting variations in pressure at a receiving station in said medium to produce a first signal, detecting three orthogonally directed components of particle velocity at said receiving station to produce three velocity-dependent signals proportional respectively to said components, multiplying said first signal by each of a selected pair of said velocity-dependent signals to form two resultant products, registering a characteristic of the vector sum of said resultant products, vectorially adding said resultant products to produce a resultant signal proportional to the vector sum of said pair of signals, multiplying said first signal by the third of said velocity-dependent signals to form a third resultant product, and registering a characteristic of the vector sum of said third resultant product and said resultant signal.

13. A system for measuring sound intensity from a source in a given medium which comprises means for detecting pressure variations at a receiving station in said medium to produce a first signal, means for detecting orthogonally directed components of particle velocity at said receiving station and for producing three velocity-dependent signals, means for multiplying said first signal by a first of said velocity-dependent signals to produce a first product voltage, means for multiplying said first signal by a second of said velocity-dependent signals to produce a second product voltage, means for registering a characteristic of the vector sum of said first and second product voltages, means for vectorially adding the first and second of said product voltages to produce a third voltage, means for multiplying said first signal by the third of said velocity-dependent signals to produce a fourth product voltage, and means for registering a characteristic of the vector sum of said third and fourth voltages.

14. A system for measuring sound intensity from a source in a given medium which comprises a pressure detector positioned at a receiving station in said medium to produce a first signal, three velocity sensitive detectors oriented with their axes mutually perpendicular for detecting orthogonally directed components of particle velocity at said receiving station and to produce three velocity-dependent signals, means for multiplying said first signal by a first of said velocity-dependent signals to produce a first product voltage, means for multiplying said first signal by a second of said velocity-dependent signals to produce a second product voltage, means for producing a pair of mutually perpendicular force fields proportional respectively to said first and second product voltages, registering means responsive to the vector sum of said force fields for registering a first characteristic of said sound intensity, means for vectorially adding the first and second of said product voltages to produce a third voltage, means for multiplying said first signal by the third of said velocity-dependent signals to produce a fourth voltage, means for producing a pair of mutually perpendicular force fields proportional respectively to said third and fourth voltages, and means for registering the vector sum of said third and fourth force fields to register a second characteristic of said sound intensity.

References Cited in the file of this patent

UNITED STATES PATENTS

| | | |
|---|---|---|
| 2,349,370 | Oiner | May 23, 1944 |
| 2,350,080 | Sproule | May 30, 1944 |